UNITED STATES PATENT OFFICE.

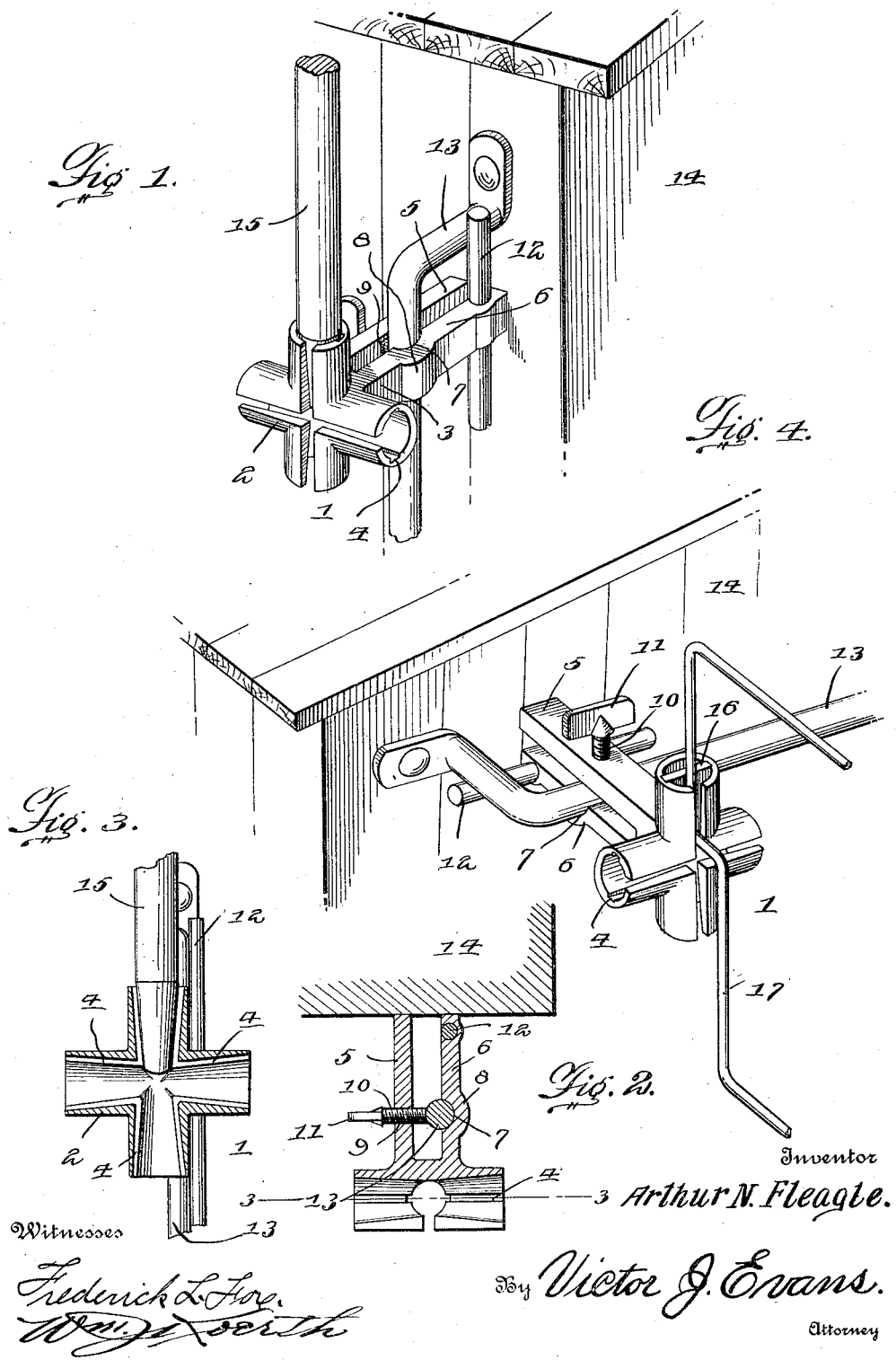

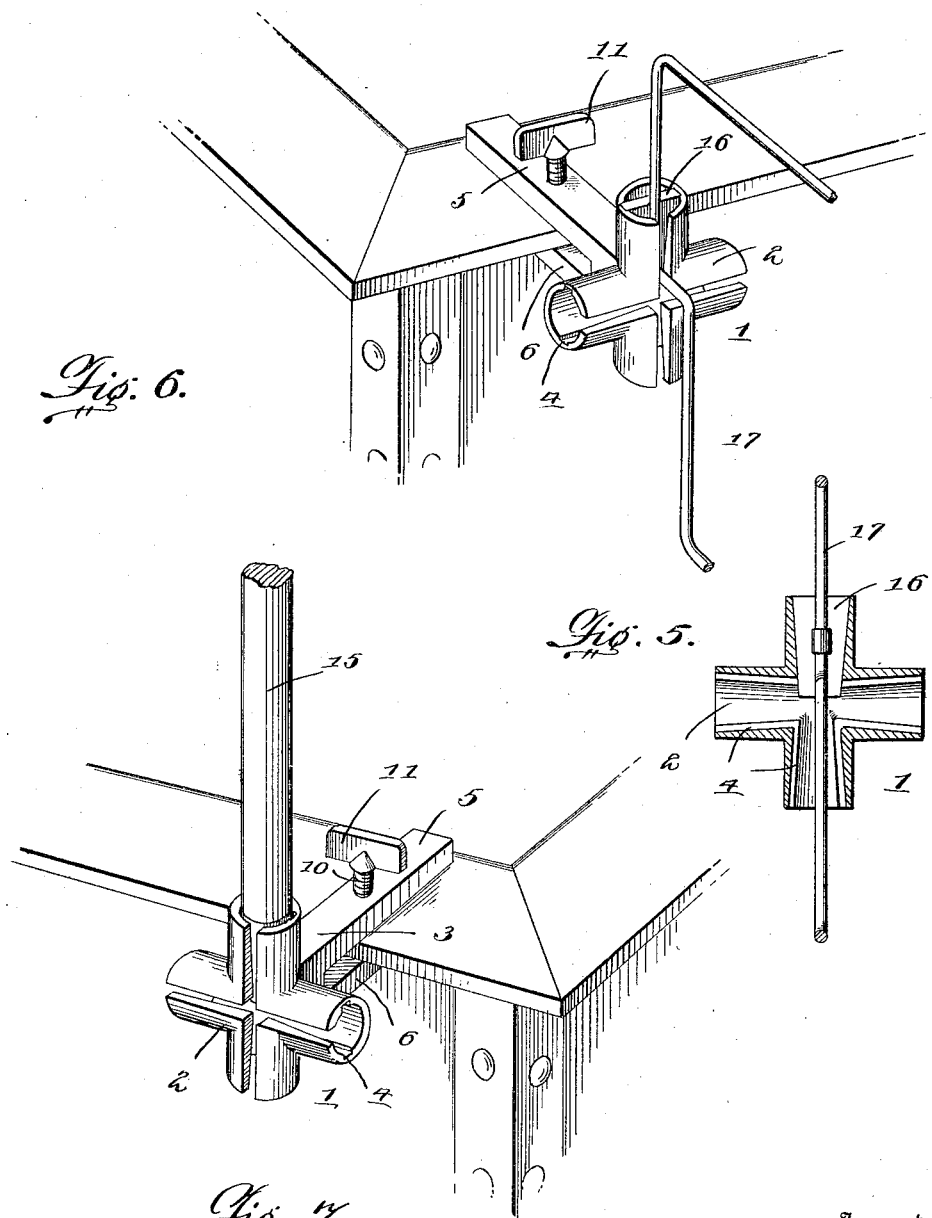

ARTHUR N. FLEAGLE, OF BALTIMORE, MARYLAND.

FLAG AND MARKER HOLDER.

1,121,487. Specification of Letters Patent. Patented Dec. 15, 1914.

Application filed January 3, 1914. Serial No. 810,214.

*To all whom it may concern:*

Be it known that I, ARTHUR N. FLEAGLE, a citizen of the United States, residing at Baltimore, in the State of Maryland, have invented new and useful Improvements in Flag and Marker Holders, of which the following is a specification.

The present invention relates to means whereby a flag or lantern may be easily, quickly and securely attached to a freight or gondola car.

In carrying out my invention I propose to provide a holder for a flag or for a marker lantern, which shall be simple, cheap and of a strong construction, and which may be easily and quickly secured upon the grab irons of cars or upon the top end or top side angles of gondolas or hopper cars, and which is so arranged as to support and hold the signal in one of four positions.

Other objects and advantages of the device will appear in the following specification, reference being had to the accompanying drawings which form part of the specification.

In the drawings there has been illustrated a simple and approved reduction of the improvement to practice, but it is to be understood that the showing therein is merely illustrative, and that I am entitled to all such changes in the size, proportion, material, etc., as fall within the scope of my claims.

In the drawings: Figure 1 is a perspective view illustrating my improved holder connected with a vertical grab iron of a car and supporting a flag staff, Fig. 2 is a central horizontal sectional view of the same, Fig. 3 is a transverse section on the line 3—3 of Fig. 2, Fig. 4 is a view illustrating the improvement secured to a horizontally disposed grab iron and suporting the bracket of a marker lamp. Fig. 5 is a transverse sectional view illustrating the manner in which the bracket of the lamp is engaged by my improved holder, Fig. 6 is a view illustrating the holder applied to the top end angle iron of a gondola or hopper car, and Fig. 7 is a similar view illustrating the holder secured to the top side angle of the car shown in Fig. 6.

The rules of railroad services require that the rear end, or last car, of all trains be designated. In daylight the last car has attached to its rear end a signal flag, while in the night time a marker lantern is employed in lieu of the flag. Engines, engine tenders, passenger cars, and cabin cars or cabooses are each provided with a fixed holder to support the signal flag or the marker lamp, but cars for freight service are not so equipped. Freight cars are frequently placed at the rear of trains—as when exigencies of train movement necessitate the placing of a car or cars behind the caboose on freight trains; or when a car is picked up by a passenger train for the quick transportation of the said car. In such cases the train men have no places provided for the attachment of flags or markers. If by day, trainmen must devise some means for holding the flag, and not infrequently the staff of the flag is forced within some hole, crevice or crack in the car, force being expended in so arranging the flag upon the car, and not only is time lost but the cars are damaged, the flag sticks broken and the flags lost. When flags are lost the rear is unmarked, a potential source of danger in itself; besides occupants of telegraph stations passed by an unmarked train are left in doubt as to whether the entire train has passed, or the rear car or cars has become uncoupled and left behind on the road. If by night, trainmen, by reason of lack of holder equipment, are forced to tie the markers to the car, an unsatisfactory method at best, as the swinging and jarring of the train easily displaces the markers, causing some to be lost and others to be broken, with the attendant cost of repairs for the latter, as well as the resultant misrepresentation of the rear of the train. Again the colored marker glasses when broken cause misrepresentation of the rear, while in other instances markers are swung to a false position, showing green where red is intended, or vice versa, and the potentiality of danger from such false representation will be readily understood.

With knowledge of the above, it is to be considered the primary object of my invention to provide a holder for the reception of flags and markers which is designed to be carried among the portable equipment of trains in freight service, that may be easily and quickly applied or removed as occasion requires and which will positively support and hold the flag or marker so that the rear or end of the train will be properly designated.

My improved holder may, as illustrated in the drawings, be in the form of a casting, and is made of metal best suited for the purpose. The holder, indicated by the numeral 1, comprises a head 2 and a body 3. The head 2 is in the shape of a cross, and is tubular. The outer face of the head, or cross, is centrally formed with both a longitudinal and a transverse opening so that all of the tubular members will be susceptible to a slight amount of expansion, as well as for an additional purpose which will presently be set forth. The head 2, it will be noted, comprises four distinct tubular members which are centrally connected at the rear thereof through the medium of the body 3. Each of the tubular members is provided with longitudinally extending, oppositely disposed depressions or channels 4, the inner walls of which being inclined or beveled inwardly from the outer edges or mouths of the said tubes toward the inner or connected portion of the tubes. Also the bore of each of the tubes is substantially cone-shaped, the widest portion being arranged at the mouths of the said tubes, and, by reference to the drawing, it will be noted that the depressed or grooved portions 4 are arranged approximately at a right angle to the outer slit or open face of the head. The body 3 extends rearwardly of the head 2, and is centrally slotted or bifurcated from its outer end to a point adjacent the rear wall of the head, so providing the said body with spaced arms 5 and 6 respectively. The arm 6 is, approximately centrally, provided upon its inner face with a rounded transverse depression or channel 7, and the outer face of the arm opposite the said channel is thickened or enlarged, as indicated by the character 8. The arm 5 is centrally provided with a threaded opening 9, the same being arranged diametrically opposite the channel 7, and co-acting or engaging with the threads in the opening 9 are the threads of the shank 10 of a thumb-screw 11. The arm 6, adjacent its end, is provided with a laterally extending rod or bar 12.

By reference to Fig. 1 of the drawings it will be noted that the channel 7 is of a size to snugly engage and receive therein at least one-half of a vertically disposed grab-iron 13 which is provided upon a car 14, the said car being the end of a train. The screw 11 is adjusted so that the end of its shank engages with the outer portion of the grab iron, or that portion not received within the channel. The lateral arm 12 is positioned to contact with one of the offset ends of the grab-iron, while the ends of the arms 5 and 6 frictionally engage with the outer face of the car 14. In this connection, it should be stated, that the distance between the ends of the arms 5 and 6 and the thumb-screw 9, as well as the channel 7 equals the length of the ends or angular portions of the grab-irons, so that when my holder is arranged upon a car the ends of the irons will be brought to engage the car. This arrangement materially assists in preventing an angular or swinging movement of the holder when arranged upon the grab-iron, and while, in practice, it has been found that the screw 11 and bar 12 are effective in rigidly securing the holder to the grab-iron, under all ordinary conditions, I have found it desirable to make the arms of a sufficient length to contact with the car. When the holder is thus arranged, the cone-shaped end of a flag staff 15 is inserted within the upper, vertically disposed tubular member of the head 2. The slitted face of the said tube, as previously stated, will permit of a desired amount of expansion thereof, so that the staff will be frictionally contacted by all of the bore of the said tube, and further the edges or corners provided by the depressions 4 and the outer slit face of the tube will serve as means for preventing a rotary movement of the staff when within the holder, and considerable pressure must be exerted upon the tube to remove the same from the holder.

By the arrangement of the tubular members or head of my holder I have found that, regardless of conditions, no separable means are required for effectively and rigidly sustaining the staff upon the holder.

It is, of course, to be understood that the staff may be inserted within any of the tubular members of the head, and the effect, above described, is common to all of the heads when engaging the stick or staff of a flag.

In Fig. 4 of the drawings the holder is illustrated as secured to a horizontally arranged grab-iron, and supporting the bracket of a marker lamp. As is well known in the art, the brackets for marker lamps is in the shape of a key-stone, comprising a flat member having two of its sides or edges inclined or beveled. The marker is designated by the numeral 16, and is adapted to be received within two of the oppositely disposed depressions 4 in any of the tubular members of the head 2. The bracket 16 is of a thickness corresponding with or slightly less than the distance between the transverse walls provided by the depressions 4, and its angular sides conform to the angular inner walls of the said depressions, and when the said bracket is forced home within the depressions, the resiliency of the tubular members is sufficient to effectively retain the bracket regardless of the vibration to which the car is subjected. The key-stone member 16 has arranged upon its outer face the marker lamp-supporting member 17, the said member including the usual longitudinally extending spaced arms, the ends of which being shaped to embrace and receive the upper and lower portions of the marker lamp, and one, or both of these arms, extend through the slit provided in the outer face of the tubular member of the head 2 within which the bracket 16 is received. The arms are so arranged within the path of contact of the edges provided by the slit in the head of the holder, and may frictionally contact with the said edges, so it will be noted the head 2 provides means for assisting in preventing the lateral movement of the lamp holder.

In Fig. 6 I have illustrated my holder applied to the top end angle iron of a gondola or hopper car of steel construction. In this figure it will be noted that the arms 5 and 6 are arranged upon the opposite faces of the angle iron, while the screw 11 is actuated to bind against the said iron. It is to be stated, in this connection, that the arms 5 and 6 have a certain amount of resiliency and exert a pressure toward each other, so the said arms materially assist the thumbscrew in sustaining the holder upon the iron.

In Fig. 7 the holder is illustrated secured to the top side angle iron of the car shown in Fig. 6.

From the above description, taken in connection with the accompanying drawings, the simplicity of the device, as well as the advantages thereof will, it is thought, be perfectly apparent to those skilled in the art to which such inventions appertain without further detailed description.

Having thus described the invention, what I claim is:

1. A signal holder for cars including an attaching body and a hollow cross-shaped member secured upon the body, said member being tubi-form and having its outer face provided with a longitudinal and an intersecting transverse opening.

2. A signal holder comprising an attaching body, a head secured upon the body, said head being of a cross-shape and each of the members of the cross being tubiform, the bore of each of the members being cone-shaped, and the outer face of each of the members being centrally slitted.

3. A signal holder for the purpose set forth comprising a body member which is centrally bifurcated to provide spaced arms, a threaded member for one of the arms, a head for the body, said head being of a cross-shape, each of the arms of the cross comprising a tube, each of the tubes having a cone-shaped bore, the bore of each of the tubes having oppositely disposed longitudinally extending depressions, the outer face of each of the tubes having an opening which extends the entire length of the arms of the cross, and the said openings being disposed at an angle with relation to the depressions.

4. A signal holder for cars including a body and a head, the body being centrally bifurcated to provide two spaced arms, one of the said arms having its inner face formed with a transverse channel, a threaded adjustable member upon the second arm disposed opposite the channel, the head being in the shape of a cross, and the arms of the cross each having a cone-shaped bore, each of the bores having diametrically opposite depressions, the inner walls of which being beveled inwardly from the ends of the arms, and the said cross-shaped head being centrally slit longitudinally and transversely.

5. A holder for signals formed from resilient material and including a body and a cross-shaped head arranged angularly of the body, the body being slotted toward the head to provide spaced arms, one of said arms having its end provided with a laterally extending bar, the said arm having its inner face formed with a transverse channel, the outer face of the arm being enlarged opposite its channel, the second arm having a threaded opening disposed opposite the channel, a thumb screw for the opening, the cross head having cone-shaped bores, the outer face of the cross head being slitted longitudinally and transversely, the bores of the head each having a longitudinally disposed depression arranged at an angle to the slit face of the head, and the inner walls of each pair of oppositely disposed depressions being inclined toward each other.

In testimony whereof I affix my signature in presence of two witnesses.

ARTHUR N. FLEAGLE.

Witnesses:
Wm. J. Koerth,
Bennett S. Jones.